(12) United States Patent
Webb

(10) Patent No.: US 8,864,414 B1
(45) Date of Patent: Oct. 21, 2014

(54) SLOT FORM FOR PIPELINE BUOYANCY CONTROL

(71) Applicant: Brian Webb, Owasso, OK (US)

(72) Inventor: Brian Webb, Owasso, OK (US)

(*) Notice: Subject to any disclaimer, the term of this patent is extended or adjusted under 35 U.S.C. 154(b) by 0 days.

(21) Appl. No.: 13/933,728

(22) Filed: Jul. 2, 2013

(51) Int. Cl.
*F16L 1/06* (2006.01)
*F16L 3/04* (2006.01)

(52) U.S. Cl.
CPC .......................................... *F16L 3/04* (2013.01)
USPC ........................................ 405/157; 405/184.4

(58) Field of Classification Search
USPC ................................ 405/157, 171, 172, 184.4
See application file for complete search history.

(56) References Cited

U.S. PATENT DOCUMENTS

| 2,007,969 | A | | 7/1935 | Grodsky |
| 3,993,192 | A | | 11/1976 | Bunn |
| 4,913,588 | A | * | 4/1990 | Vilnes ............................ 405/157 |
| 5,385,430 | A | | 1/1995 | Connors |
| 8,360,688 | B2 | | 1/2013 | Gunn et al. |

FOREIGN PATENT DOCUMENTS

| CA | 2179969 | A | * | 12/1997 |
| JP | 55155832 | A | * | 12/1980 |
| RU | 2047035 | C1 | * | 10/1995 |
| RU | 2054595 | C1 | * | 2/1996 |
| RU | 2056568 | C1 | * | 3/1996 |
| RU | 2062938 | C1 | * | 6/1996 |
| RU | 2066412 | C1 | * | 9/1996 |
| RU | 2115857 | C1 | * | 7/1998 |
| RU | 2123148 | C1 | * | 12/1998 |
| RU | 2147352 | C1 | * | 4/2000 |
| RU | 2185561 | | | 7/2002 |
| RU | 2185561 | C1 | * | 7/2002 |
| RU | 2214548 | C1 | * | 10/2003 |
| RU | 2226635 | C1 | * | 4/2004 |
| RU | 2227239 | C1 | * | 4/2004 |
| RU | 2228480 | C1 | * | 5/2004 |
| RU | 2229650 | C1 | * | 5/2004 |
| RU | 2244194 | C1 | * | 1/2005 |
| RU | 2266457 | C1 | * | 12/2005 |
| RU | 2325577 | C2 | * | 5/2008 |
| RU | 2341715 | | | 12/2008 |
| RU | 2341715 | C2 | * | 12/2008 |
| RU | 2342586 | C1 | * | 12/2008 |
| SU | 1551930 | | | 3/1990 |
| SU | 1751576 | A2 | * | 7/1992 |
| SU | 1765595 | A1 | * | 9/1992 |
| SU | 1818493 | | | 5/1993 |
| SU | 1818493 | A1 | * | 5/1993 |
| WO | WO 9708484 | A1 | * | 3/1997 |

* cited by examiner

*Primary Examiner* — Sunil Singh
(74) *Attorney, Agent, or Firm* — Head, Johnson & Kachigian, P.C.

(57) ABSTRACT

A device for controlling buoyancy of a buried pipeline, the device comprising a form placed atop the pipeline and a flexible strap extending around the form adjacent its top. The form may comprise a first trough located adjacent the first side of the pipeline, a second trough located adjacent the opposing second side of the pipeline, and a middle section with an inverted-U-shaped cross section such that the middle portion fits over the top of the pipeline and joins the first trough and the second trough. The troughs are filled with backfill when the pipeline is buried. Thus, when fully installed, the device may comprise the slot form, the strap, and the backfill. As the pipeline tends to rise, the straps deform, bringing the sides of the troughs inward and compressing the backfill therein. This prevents further upward movement of the pipeline.

17 Claims, 4 Drawing Sheets

SLOT FORM FOR PIPELINE BUOYANCY CONTROL

CROSS REFERENCE

Not Applicable.

BACKGROUND OF THE INVENTION

1. Field of the Invention

This invention relates generally to a device for holding down a buried pipeline, and more particularly, but not by way of limitation, to a slot form for pipeline buoyancy control.

2. Description of the Related Art

Large diameter pipelines over thirty inches in diameter will float in water with only 40% submerged. In high-density soupy soils, the pipe will float with only 20% submerged. The art of keeping a pipeline buried in these conditions is called buoyancy control.

Current methods of buoyancy control are concrete set on weights and gravel filled bags. These are density-type buoyancy control and work by adding weight to the pipe. There are several more methods available but they have not been accepted by the pipeline industry because of cost.

Set on weights, as shown in FIG. 1, are weights made of concrete with an inverted-U-shaped cross section to allow the weight to be placed over the pipe. The weight will hold the pipeline in place. Bags filled with gravel may also be used, as shown in FIG. 2, with one bag located on each side of the pipe and a flexible strap over the pipe attaching the two bags.

The problem with both of these prior art devices for buoyancy control is that they are heavy and must be constructed off site and transported to the pipeline, where they must be placed on top of the pipeline at regular intervals. This requires considerable installation costs, including the costs of transportation, machinery, and manpower, given the extreme weight of the devices and their bulky nature.

Based on the foregoing, it is desirable to provide a device for buoyancy control that is lightweight and capable of being installed without the use of lifting equipment.

It is further desirable to provide such a device that requires minimum labor for installation.

It is further desirable to provide such a device that reduces the cost of installation compared to set-on weights or bags, thus reducing the cost of service for transporting product through the pipeline.

SUMMARY OF THE INVENTION

In general, in a first aspect, the invention relates to a device for controlling buoyancy of a pipeline with a top, a first side, and an opposing second side. The device comprises a form, where the form has a top, a bottom, two opposing sides, and two opposing ends, and a strap encircling the form adjacent the top of the form, such that the strap runs along each of the two sides and spans the two ends. The form comprises: a first trough located adjacent the first side of the pipeline; a second trough located adjacent the opposing second side of the pipeline; and a middle portion, where the middle portion has an inverted-U-shaped cross section such that the middle portion fits over the top of the pipeline and joins the first trough and the second trough.

The form may be a single continuous piece of material, and may be made of plastic or other suitable material. The first trough and the second trough may each have open tops. The two opposing ends of the form may be open. The pipeline may have a height and the form have a height generally equal to the height of the pipeline, such that each of the sides extends the full height of the pipeline and/or such that the first trough and the second trough are each generally equal in depth to the height of the pipeline. The form may have an inverted-M-shaped cross section.

The strap may be flexible. The strap may be attached to the form via one or more attachment devices, such as a plurality of rivets. Each of the sides of the form may fold outward over themselves to form a channel along each of the sides at the top of the form, and the strap may extend through the channels. The strap may attach to itself to form a continuous loop. The device may further comprise two end straps, each encircling one of the ends of the form.

The device may further comprise backfill located within the first trough and the second trough. The device may further comprise backfill located on top of the form.

The invention further relates to a method of controlling buoyancy of a pipeline in a ditch, where the pipeline has a top, a first side, and an opposing second side. The method comprises placing a plurality of buoyancy control devices atop the pipeline in the ditch and filling the ditch with backfill such that each of the devices is filled with backfill and the devices and pipeline are each covered with backfill. Each of the buoyancy control devices may comprise a form, where the form has a top, a bottom, two opposing sides, and two opposing ends, and a strap encircling the form adjacent the top of the form, such that the strap runs along each of the two sides and spans the two ends. The form may comprise: a first trough located adjacent the first side of the pipeline, where the first trough has an open top; a second trough located adjacent the opposing second side of the pipeline, where the second trough has an open top; and a middle portion, where the middle portion has an inverted-U-shaped cross section such that the middle portion fits over the top of the pipeline and joins the first trough and the second trough. The plurality of buoyancy control devices may be placed at regular intervals along the pipeline.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 1:
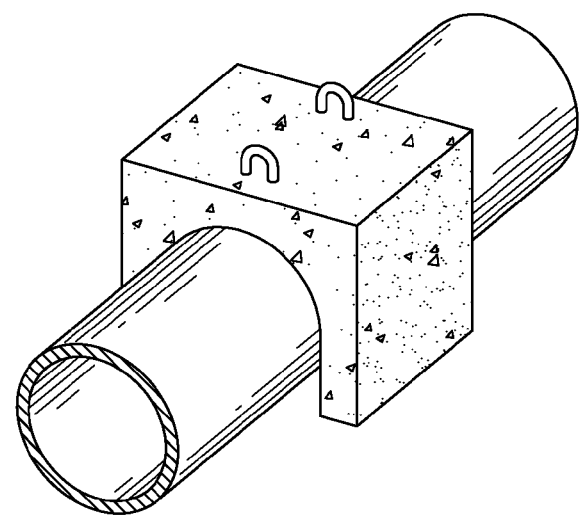
FIG. 1 is perspective view of a prior art set-on weight.
Figure 2:
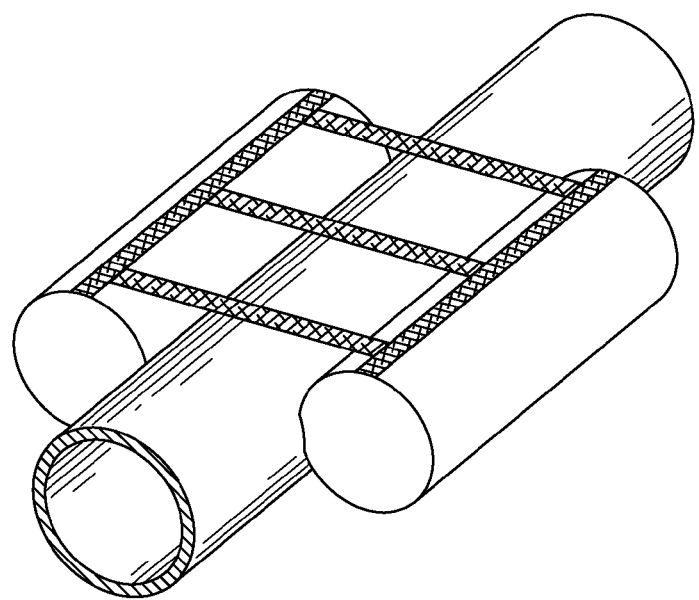
FIG. 2 is a perspective view of a prior art bag-type weight.
Figure 3:
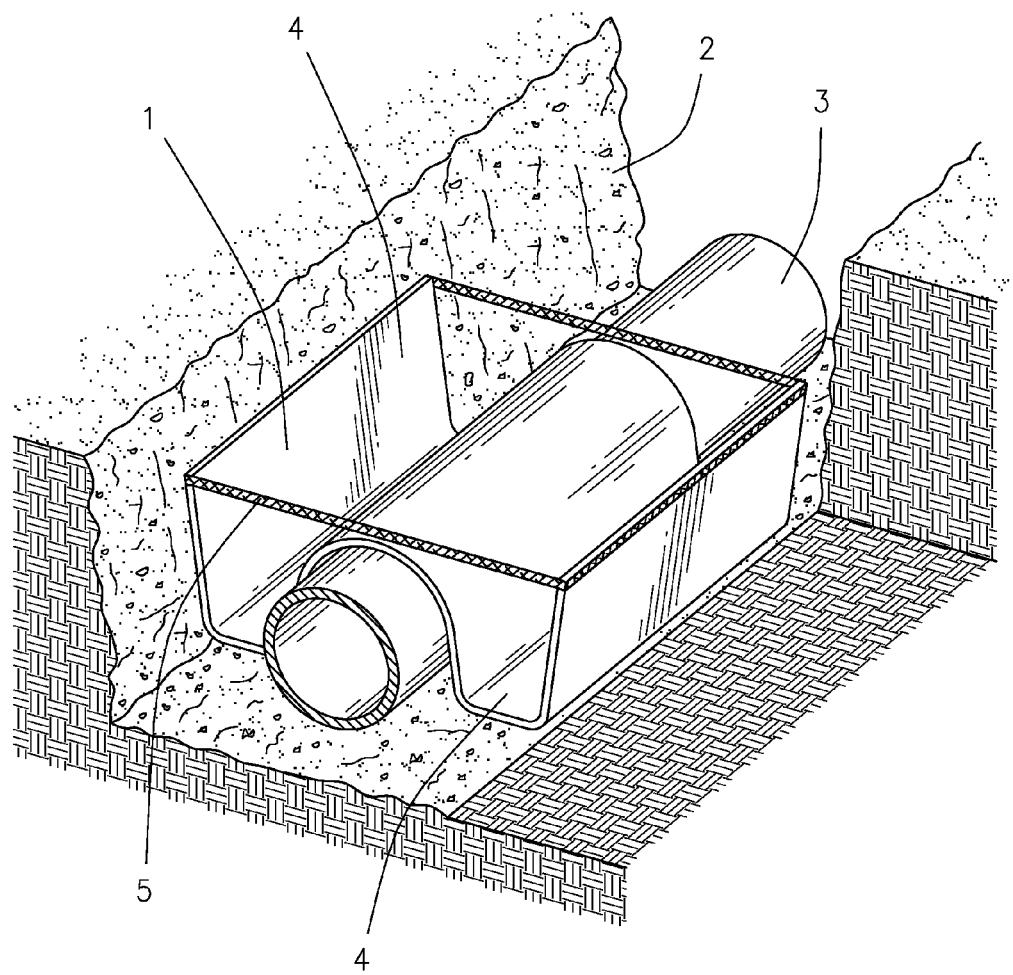
FIG. 3 is a perspective view of a slot form for pipeline buoyancy control, shown in place on a pipeline in a ditch, both shown in a cut-away view.

In general, in a first aspect, the invention relates to a slot form for pipeline buoyancy control. The slot form 1 may be shaped to fit within a ditch 2 over a pipeline 3, as shown in FIG. 3. Specifically, the slot form 1 may have an inverted-M-shaped cross section, such that the slot form 1 extends downward within the ditch 2, across a section of the bottom of the ditch 2, up over the pipeline 3, down the other side of the pipeline 3, across another section of the bottom of the ditch 2, and upward within the ditch 2, generally forming a rounded W shape. in other words, the slot form 1 may have a middle section with an inverted-U-shaped cross section such that the middle section fits over the pipe 3 and two side sections extending from the middle section initially outward, then upward. Thus, the slot form 1 covers a section of the pipeline 3 and forms two troughs 4, one on each side of the pipeline 3. The troughs 4 may extend from the bottom of the ditch 2 to the full height of the pipeline 3.

Figure 6:
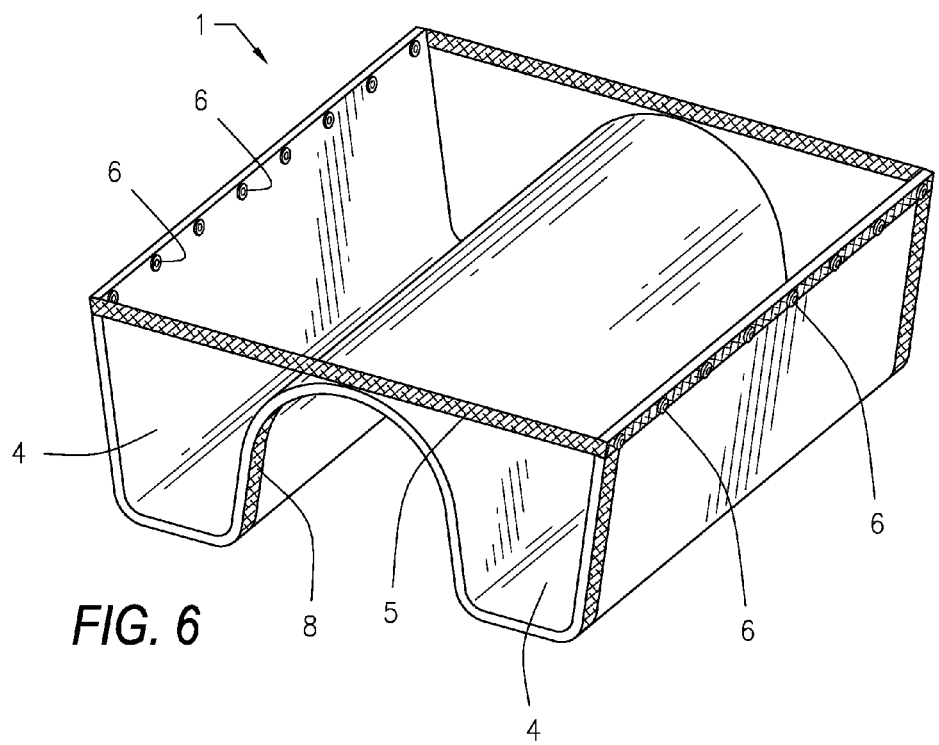
FIG. 6 is a perspective view of the slot form shown with optional rivets and an optional additional end strap.
Figure 7:
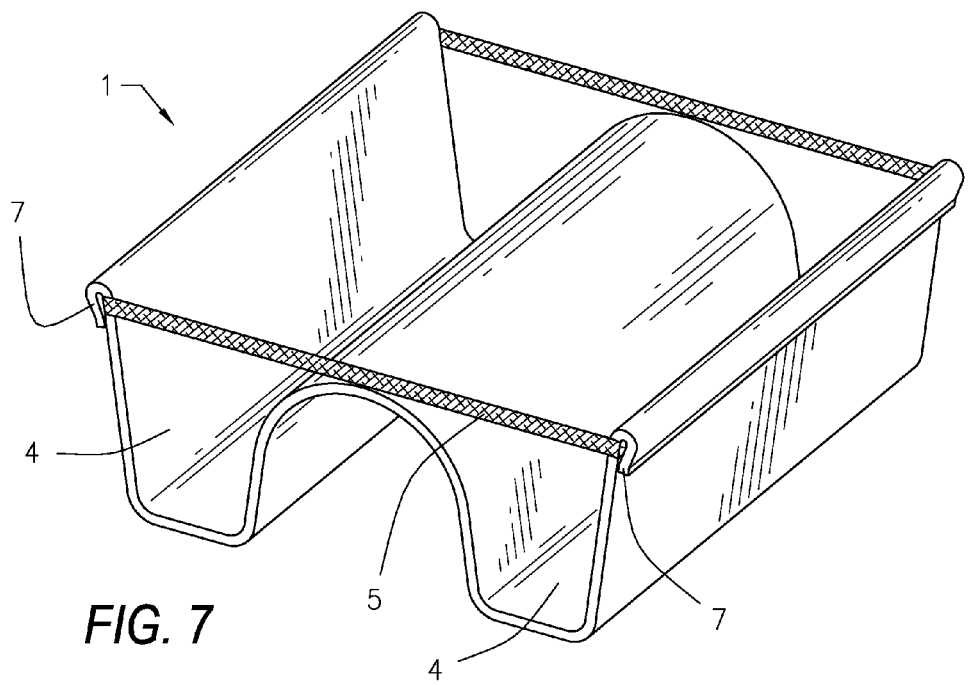
FIG. 7 is a perspective view of the slot form shown with an optional folded edge to hold its strap.

A strap 5 may extend at least across the ends of the slot form 1 at the top of the slot form 1. Preferably, the strap 5 may extend fully around the upper perimeter of the slot form 1, such that it extends around the tops of the outer walls of the troughs 4 and across the ends of the slot form 1. The strap 5 may be flexible. The strap 5 may be fastened to the outer edge of the slot form 1 by one or more attachment devices 6, such as rivets or other suitable attachment devices, as shown in FIG. 6. Additionally or alternately, the outer upper edges of the slot form 1 may fold outward on themselves, forming channels 7 along the outer upper edges of the slot form, as seen in FIG. 7. The strap 5 may fit within the channels 7. Additionally or alternately, a strap 8 may encircle the end of the slot form 1, as shown in FIG. 6. The strap 8 may run along the bottom and up the sides of the slot form 1 at its end, with another encircling the other end.

Figure 4:
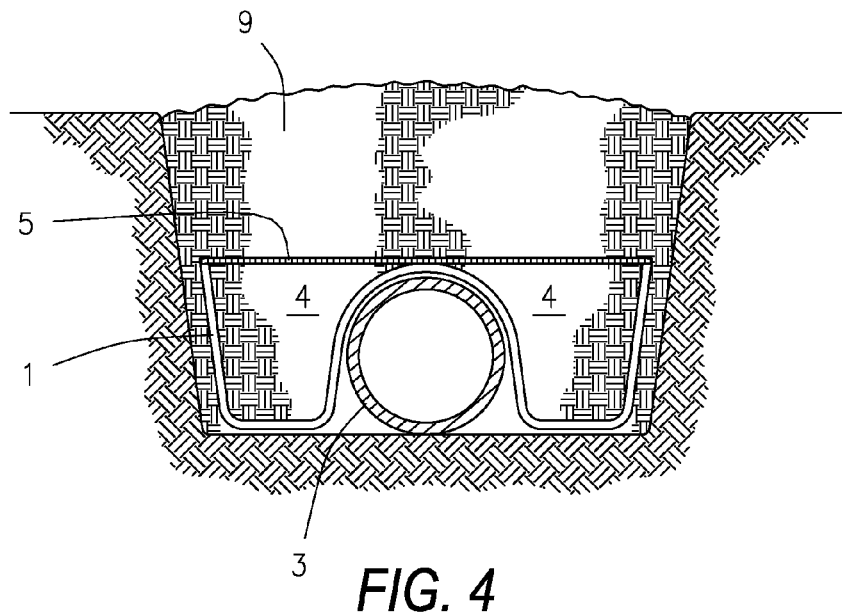
FIG. 4 is an end view of the slot form, shown in place on a pipeline in a ditch filled with backfill.
Figure 5:
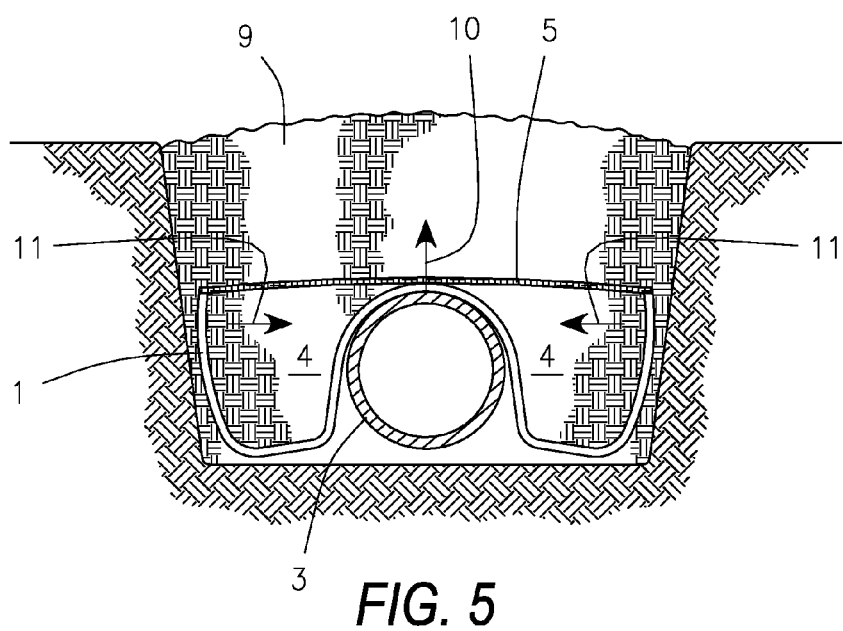
FIG. 5 is an end view of the slot form, shown in place on a pipeline in a ditch filled with backfill, where the pipeline has attempted to float upward within the backfill from its original placement.

The slot form 1 may be placed over the pipeline 3 in the ditch 2, as shown in FIG. 3. The troughs 4 are thus located on either side of the pipe 3, between the pipe 3 and the sides of the ditch 2. The slot form does not require gavel, concrete, or select material to be hauled to the job site for weight. instead, the slot form 1 uses backfill 9, which then becomes a part of the weight, as seen in FIG. 4. Thus, when fully installed, the device may comprise the slot form 1, the strap 5, and the backfill 9. When the pipe 3 tends to rise because of flotation, as indicated by arrow 10 in FIG. 5, the straps 5 pull the edges of the slot form 1 toward the pipe, as indicated by arrows 11 in FIG. 5. This compresses the backfill 9 within the troughs, thus forming a structure comprising the backfill 9, the slot form 1, and the strap 5, preventing the pipe 3 from rising. The width of the structure extends from edge to edge of the slot form 1, affecting all of the backfill 9 over the structure. Therefore, the entire weight of the backfill 9 over the slot form 1 is used for buoyancy control.

The slot form 1 may be made of plastic or other suitable material. The slot form 1 itself may be lightweight and stackable, thus reducing transportation costs, and may be easily installed without lifting equipment, thus reducing installation costs. The weight of the structure is applied when the ditch 2 is backfilled, and thus additional installation procedures or equipment are not required, thus further reducing costs of installation.

Whereas, the devices and methods have been described in relation to the drawings and claims, it should be understood that other and further modifications, apart from those shown or suggested herein, may be made within the spirit and scope of this invention.

What is claimed is:

1. A device for controlling buoyancy of a pipeline with a top, a first side, and an opposing second side, the device comprising:
    a form, where the form has a top, a bottom, two opposing sides, and two opposing ends, where the two opposing ends of the form are open, and where the form comprises:
        a first trough located adjacent the first side of the pipeline;
        a second trough located adjacent the opposing second side of the pipeline; and
        a middle portion, where the middle portion has an inverted-U-shaped cross section such that the middle portion fits over the top of the pipeline and joins the first trough and the second trough; and
    a strap encircling the form adjacent the top of the form, such that the strap runs along each of the two sides and spans the two ends, where the strap remains in place encircling the form while the device is in use.

2. The device of claim 1 where the form is a single continuous piece of material.

3. The device of claim 1 where the form is made of plastic or other suitable material.

4. The device of claim 1 where the first trough and the second trough each have open tops.

5. The device of claim 1 where the pipeline has a height and where the form has a height generally equal to the height of the pipeline, such that each of the sides extends the full height of the pipeline.

6. The device of claim 1 where the pipeline has a height and where the form has a height generally equal to the height of the pipeline, such that the first trough and the second trough are each generally equal in depth to the height of the pipeline.

7. The device of claim 1 where the form has an inverted-M-shaped cross section.

8. The device of claim 1 where the strap is flexible.

9. The device of claim 1 where the strap is attached to the form via one or more attachment devices.

10. The device of claim 9 where the attachment devices are a plurality of rivets.

11. The device of claim 1 where each of the sides of the form fold outward over themselves to form a channel along each of the sides at the top of the form, where the strap extends through the channels.

12. The device of claim 1 where the strap attaches to itself to form a continuous loop.

13. The device of claim 1 further comprising two end straps, each encircling one of the ends of the form.

14. The device of claim 1 further comprising backfill located within the first trough and the second trough.

15. The device of claim 14 further comprising backfill located on top of the form.

16. A method of controlling buoyancy of a pipeline in a ditch, where the pipeline has a top, a first side, and an opposing second side, the method comprising:
    placing a plurality of buoyancy control devices atop the pipeline in the ditch, each device comprising:
        a form, where the form has a top, a bottom, two opposing sides, and two opposing ends, where the two opposing ends of the form are open and where the form comprises:
            a first trough located adjacent the first side of the pipeline, where the first trough has an open top;
            a second trough located adjacent the opposing second side of the pipeline, where the second trough has an open top; and a middle portion, where the middle portion has an inverted-U-shaped cross section such that the middle portion fits over the top of the pipeline and joins the first trough and the second trough; and a strap encircling the form adjacent the top of the form, such that the strap runs along each of the two sides and spans the two ends, where the strap remains in place encircling the form while the device is in use; and filling the ditch with backfill such that each of the troughs is filled with backfill and the form and pipeline are each covered with backfill.

17. The method of claim 16 where the plurality of buoyancy control devices are placed at regular intervals along the pipeline.

* * * * *